(12) United States Patent
Palmer et al.

(10) Patent No.: US 11,480,719 B2
(45) Date of Patent: *Oct. 25, 2022

(54) THIN LAMINAR MATERIAL FOR PRODUCING SHORT WAVE INFRARED EMISSION

(71) Applicant: Cyalume Technologies, Inc., West Springfield, MA (US)

(72) Inventors: William R. Palmer, Rescue, CA (US); Stephen L. Palmer, Cameron Park, CA (US)

(73) Assignee: Cyalume Technologies, Inc., West Springfield, MA (US)

( * ) Notice: Subject to any disclaimer, the term of this patent is extended or adjusted under 35 U.S.C. 154(b) by 105 days.

This patent is subject to a terminal disclaimer.

(21) Appl. No.: 16/940,428

(22) Filed: Jul. 28, 2020

(65) Prior Publication Data

US 2021/0109264 A1 Apr. 15, 2021

Related U.S. Application Data

(63) Continuation of application No. 16/044,294, filed on Jul. 24, 2018, now Pat. No. 10,746,377.

(Continued)

(51) Int. Cl.
*G02B 5/20* (2006.01)
*C09K 11/02* (2006.01)
(Continued)

(52) U.S. Cl.
CPC .............. *G02B 5/208* (2013.01); *C09K 11/02* (2013.01); *C09K 11/08* (2013.01); *C09K 11/77* (2013.01);
(Continued)

(58) Field of Classification Search
CPC ........ G02B 5/208; G02B 5/223; C09K 11/02; C09K 11/08; C09K 11/77; F21V 9/04; F21V 9/06

See application file for complete search history.

(56) References Cited

U.S. PATENT DOCUMENTS

| 7,777,208 B2 | 8/2010 | Cranor |
| 2006/0108065 A1 | 5/2006 | Wang et al. |
(Continued)

FOREIGN PATENT DOCUMENTS

| TW | 201414959 | 4/2014 |
| WO | WO2008112886 | 9/2008 |
| WO | WO2009036307 | 3/2009 |

OTHER PUBLICATIONS

Liang, Y. et al., "Extending the applications for lanthanide ions: efficient emitters in short-wave infrared persistent luminescence", J. Mater. Chem. C., vol. 5, pp. 6488-6492, (2017).

*Primary Examiner* — Eliza W Osenbaugh-Stewart
(74) *Attorney, Agent, or Firm* — McHale & Slavin, P.A.

(57) ABSTRACT

A short wavelength infrared (SWIR) energy emitting system or material for producing SWIR energy from an emission source emitting electromagnetic energy. The SWIR energy system or material comprises a phosphor material, an electromagnetic energy blocking member, a substrate for delivering the system or material to an electromagnetic energy emission source, and optionally, a securing member. The SWIR energy system or material may be in the form of a tape, sheet, or other laminar material capable of producing short wave infrared emission when excited at wavelengths shorter than that of the emission.

25 Claims, 12 Drawing Sheets

Related U.S. Application Data

(60) Provisional application No. 62/536,253, filed on Jul. 24, 2017, provisional application No. 62/536,258, filed on Jul. 24, 2017.

(51) Int. Cl.

| | | |
|---|---|---|
| *G02B 5/22* | (2006.01) | |
| *C09K 11/08* | (2006.01) | |
| *C09K 11/77* | (2006.01) | |
| *F21V 9/06* | (2018.01) | |
| *F21V 17/04* | (2006.01) | |
| *F21V 9/04* | (2018.01) | |
| *F21V 9/32* | (2018.01) | |
| *G02F 1/01* | (2006.01) | |

(52) U.S. Cl.
CPC .................. *F21V 9/04* (2013.01); *F21V 9/06* (2013.01); *F21V 9/32* (2018.02); *F21V 17/04* (2013.01); *G02B 5/223* (2013.01); *G02F 1/01* (2013.01)

(56) References Cited

U.S. PATENT DOCUMENTS

| | | |
|---|---|---|
| 2008/0246388 A1 | 10/2008 | Cheon et al. |
| 2017/0041560 A1* | 2/2017 | Gotoh .................. G01J 3/2823 |
| 2018/0299587 A1 | 10/2018 | Aitken et al. |
| 2019/0039349 A1* | 2/2019 | Shoda ....................... B32B 7/02 |
| 2019/0128506 A1 | 5/2019 | Schmerling et al. |

\* cited by examiner

THIN LAMINAR MATERIAL FOR PRODUCING SHORT WAVE INFRARED EMISSION

CROSS REFERENCE TO RELATED APPLICATIONS

In accordance with 37 C.F.R. 1.76, a claim of priority is included in an Application Data Sheet filed concurrently herewith. Accordingly, the present invention claims priority as a continuation-in-part of U.S. patent application Ser. No. 16/044,294, entitled "THIN LAMINAR MATERIAL FOR PRODUCING SHORT WAVE INFRARED EMISSION" filed Jul. 24, 2018, which claims priority to U.S. Provisional Patent Application No. 62/536,253 entitled "THIN LAMINAR MATERIAL FOR PRODUCING SHORT WAVE INFRARED EMISSION" filed Jul. 24, 2017 and to U.S. Provisional Patent Application No. 62/536,258, entitled "LIGHT WEIGHT APPLIANCE TO BE USED WITH SMART DEVICES TO PRODUCE SHORTWAVE INFRARED EMISSION" filed Jul. 24, 2017. The contents of the above referenced applications are incorporated herein by reference in their entirety.

FIELD OF THE INVENTION

The present disclosure relates to a short wavelength infrared (SWIR) energy emitting system that can be conveniently utilized to produce SWIR energy from existing light emitting items; and more particularly, to tape, sheet or other laminar material capable of producing short wave infrared emission when excited at wavelengths shorter than that of the emission wavelengths.

Near-infrared radiation has been used for some time to make observations in the dark. For example, the study of nocturnal animals has been significantly enhanced with the use of night-vision equipment and near-infrared illuminators. Night-vision equipment and near-infrared illuminators have also been used for law-enforcement and military purposes. The ability of one to "see in the dark" can provide a significant advantage over those who cannot. This advantage is diminished as adversaries gain access to this technology. A solution may be realized through the application of infrared energy sources that are not visible to standard night-vision equipment.

The use of Short Wave Infrared (SWIR) energy provides one such solution. The SWIR band is generally considered to be those wavelengths between approximately 1000 nanometers and approximately 3000 nanometers. The Near Infrared (NIR) band is generally considered to be those wavelengths between approximately 700 nanometers and 1000 nanometers. SWIR energy wavelengths are longer than those of Near Infrared (NIR) and, as such, are invisible to standard night vision equipment. Additionally, energy in the SWIR band is not visible to "day/night" cameras, which are capable of imaging in the NIR bands as well as the visible (VIS). SWIR imagers typically employ InGaAs (indium gallium arsenide) chemistry in their imaging sensors. Since these imagers are difficult to manufacture and are relatively expensive, they have not proliferated to the extent that night vision equipment has and, therefore, the use of SWIR imagers and SWIR illuminators still offers a tactical advantage in many environments. The SWIR illuminators may, of course, also be used for signaling and identification purposes, in addition to being sources of illumination for imagers. SWIR energy may be generated by special LEDs, lasers or filtered incandescent sources, or other known means. A variety of electrically powered SWIR emitting devices are available for tactical use, most being battery powered. As users transition from near-infrared and standard night vision equipment to SWIR imagers, there is a growing need for SWIR systems and devices.

SUMMARY OF THE INVENTION

It is, accordingly, an object of the invention to provide a short wavelength infrared (SWIR) energy emitting system or material that can be conveniently utilized to produce SWIR energy from existing electromagnetic energy, i.e. visible or ultraviolet light emitting items, such as smart phones, tablets, flashlights, vehicle lighting systems, residential lighting systems and similar light emitting devices. Such a system or material would be invaluable, in that nearly any light producing item could be converted to produce SWIR emission. Further, the system or material could incorporate a visible and NIR light blocking member that would render the emission source invisible to NIR and visible detection systems. Such a system or material would provide a covert source of illumination that would not be readily detected by others.

The SWIR emitting system or material may be configured to provide protection from ultraviolet light or from actinic energy, such as ultraviolet light from the sun.

The SWIR emitting system or material may be configured to provide a low-sheen surface, that reduces specular reflection.

The SWIR emitting system or material may be configured to repel dust and debris.

The SWIR emitting system or material may be configured to allow for control of texture, appearance, degree of flexibility and durability.

The SWIR emitting system or material may be configured to employ a plurality of dyes or other energy blocking agents in the top layer so that the spectral emission of the system may be controlled. In this embodiment, the SWIR emitting system or material may be used as a identifying unit having a unique or identifying spectra fingerprint.

If the system or material was in the form of a thin, laminar sheet, or a tape, it could readily be applied to light emitters on smart devices, such as the camera flash on a smart phone. Additionally, if the system comprised an adhesive, such as a pressure sensitive adhesive, it could be quickly and conveniently applied to the face of a light emitter, such as a vehicle headlight, thereby converting the headlight from a visible lighting source to a high-powered SWIR source. Ideally, the sheet or tape would be easily trimmed and adjusted to fit specific applications, such as intricate geometries and warped surfaces.

Generally, the present invention provides a product which may be in the form of a tape, sheet or other thin, laminar material (henceforth referred to simply as "tape") that may be readily affixed to visible or ultraviolet light producing devices, such as smart phones, smart tablets, flashlights or the like. The tape produces SWIR energy emission when optically coupled to the visible light producing device when the source of visible light is switched on. Additionally, the instant invention could be applied to vehicle running lights, emergency beacons, instrument panel lights, traffic signal lights, aircraft operating and landing lights, and any other light source for which it may be desirable to convert visible light to SWIR. The tape could also serve to at least partly block visible and NIR emissions from the light-producing device to which it is applied, thereby rendering these emissions invisible to the naked eye, night vision devices and day-night cameras.

Such a tape would be highly desirable for situations where the user needs to produce SWIR energy but must be careful not to emit visible or NIR energy. For instance, a vehicle which had its headlights covered with this tape could be driven covertly by an operator equipped with a SWIR imaging system. A night-time drone operator could easily add a few pieces of this tape to the position lights on the drone so that its location and relation to other objects could be visually observed with the aid of a SWIR camera, while the drone would be invisible to those not equipped with the SWIR camera. The tape could be removed if it was desired to repair the drone to its normal lighting mode.

In many instances, it would also be highly beneficial if the tape was compact, lightweight, capable of surviving exposure to rain, sunlight, and temperature extremes, and was mechanically robust. In some cases, however, it may be preferred to render the tape non-functional upon extended exposure to the elements or upon removal from the object to which it had been affixed, thus preventing unauthorized re-use. Both functions are anticipated by this invention. Such a tape would find great utility if the visible light emitting device could be switched on and off as may be desired, for example in a pre-determined pattern, thereby permitting coded signals to be produced. A smart phone or tablet could easily perform this function when outfitted with the SWIR tape and running a suitable software application.

In an illustrative embodiment, the invention may include a short wavelength infrared (SWIR) energy emitting system or material for producing SWIR energy from an emission source emitting electromagnetic energy, such as visible or ultraviolet light, comprising a phosphor material; an electromagnetic energy blocking member; and a substrate for delivering said system to an emission source. The system or material may further include a securing member, such as an adhesive.

An efficient, compact, light-weight, energy conversion tape, suitable for the intended application, has been created using certain, rare-earth phosphors in combination with various selective wavelength-blocking optical filters. The filters, at least partially, block emissions of NIR and/or visible light. Preferably the filters block these emissions sufficiently to prevent observation by the naked eye, by the use of night vision equipment, day-night cameras, or other detection devices, sensors, or detection technology.

Alternatively, the short wavelength infrared (SWIR) energy emitting system or material for producing SWIR energy from an emission source emitting electromagnetic energy may be configured to either block, pass or partially attenuate any desired portion of the energy in the near-infrared (NIR), ultraviolet (UV) or visible energy bands.

In one aspect of the invention, the tape takes the form of a thin sheet with an attachment means, preferably an adhesive backing; said backing allowing the tape to be readily attached to the visible light or ultraviolet emitting feature of the light emitting device.

Another aspect of the invention incorporates a mechanism to prevent re-use of the tape so that discarded tape materials cannot be re-used by an adversary.

Other aspects of the disclosure include various flexible, semi-flexible, or stretchable tapes that are configured to be readily applied to visible light or ultraviolet emitting devices.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
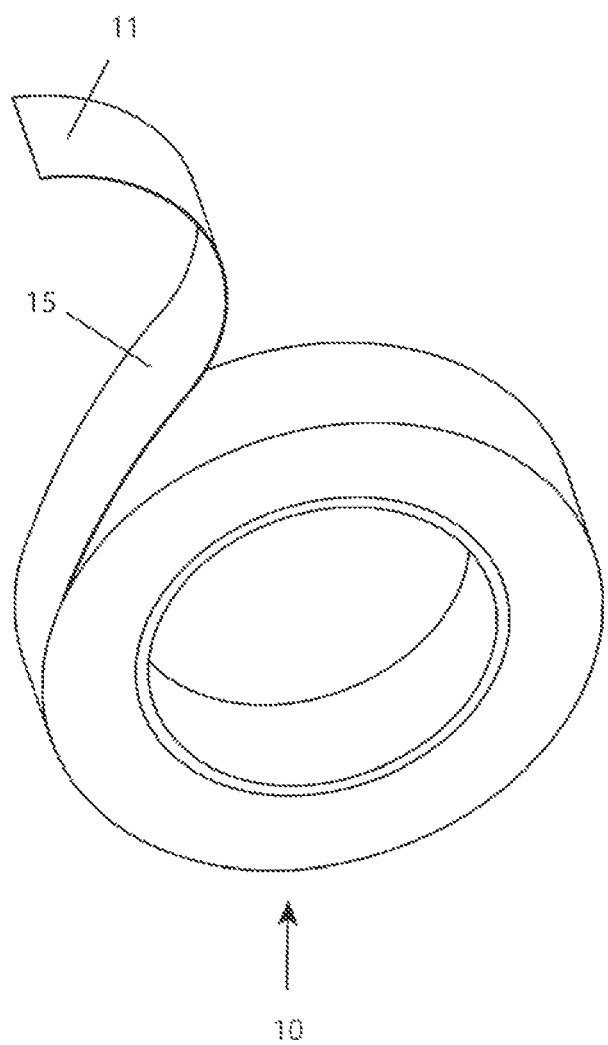
FIG. 1 illustrates an embodiment of a short wavelength infrared (SWIR) energy emitting system for producing SWIR energy from an emission source emitting electromagnetic energy, shown as a SWIR emitting tape supplied in a rolled form.

While the present invention is susceptible of embodiment in various forms, there is shown in the drawings and will hereinafter be described a presently preferred, albeit not limiting, embodiment with the understanding that the present disclosure is to be considered an exemplification of the present invention, and is not intended to limit the invention to the specific embodiments illustrated.

The present invention is directed towards a short wavelength infrared (SWIR) energy emitting system for producing SWIR energy from an emission source emitting electromagnetic energy, preferably visible or ultraviolet light, referred to generally as a SWIR energy system or material 10. The SWIR energy system or material 10 comprises a phosphor material; an electromagnetic energy blocking member; a substrate for delivering said system to an emission source, and optionally, a securing member. The phosphor allows the SWIR energy system or material 10 to emit SWIR, preferably when excited at its absorption wavelengths associated with visible or ultraviolet light.

Figure 7:
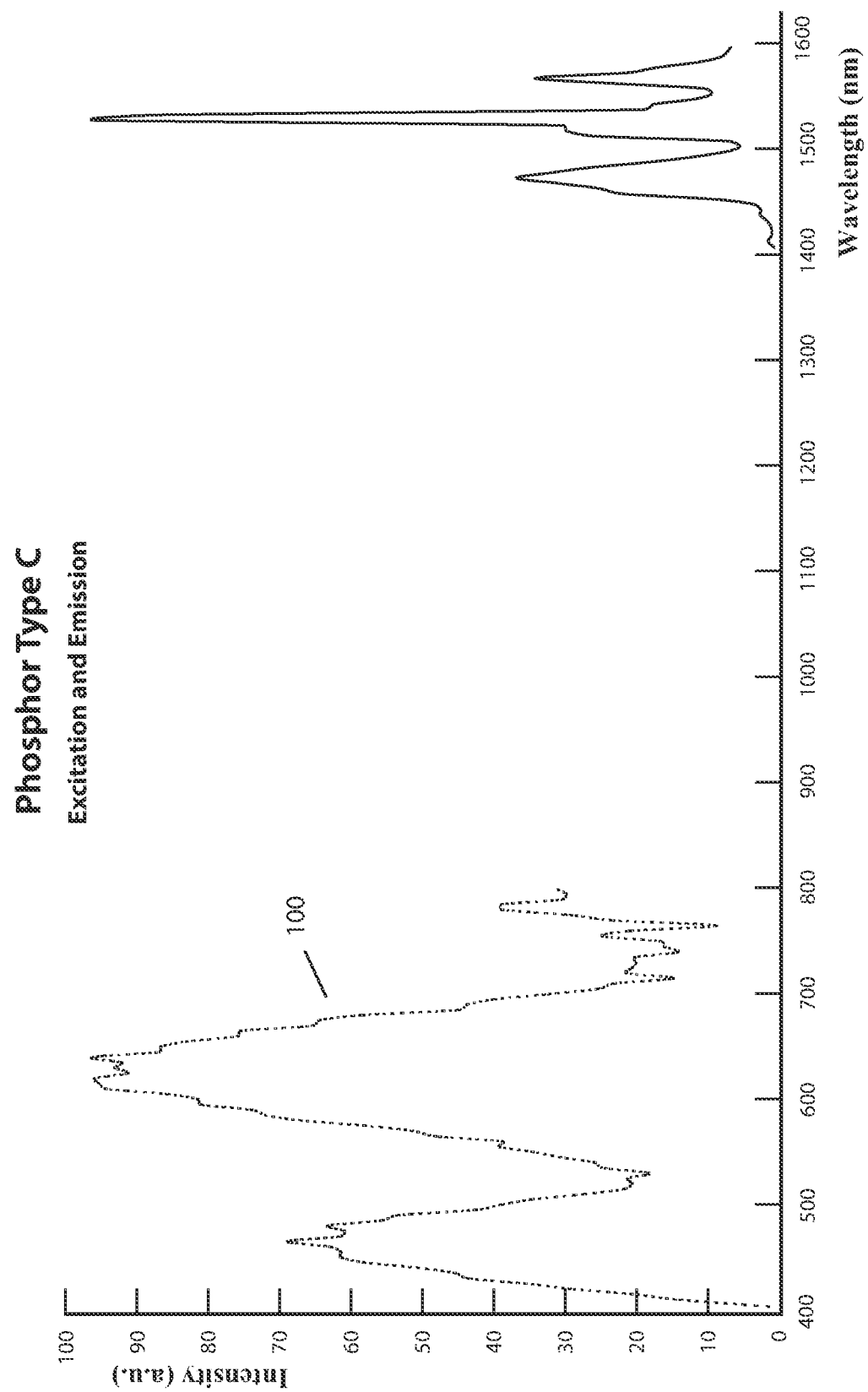
FIG. 7 illustrates an absorption and emission spectra of a phosphor which exhibits strong absorption between about 540 nm and 700 nm.

Phosphors that are capable of producing SWIR energy when exposed to visible light are known. For example, the SWIR energy system or material 10 may use one or more rare-earth phosphors, i.e. lanthanides (those chemicals listed on the chemical table having atomic numbers from 57-71, including Lanthanum, (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), and Lutetium (Lu)), as well as Scandium and Yttrium may be used. Illustrative examples of the desired phosphor preferably emit energy at various wavelengths of between about 1000 nm and about 3000 nm. One illustrative example may be the phosphor which produces a Nd:YAG laser. Another illustrative example is a phosphor capable of emitting energy at various wavelengths, between about 1400 nm and about 1600 nm, when properly excited at its absorption wavelengths of between about 400 nm and about 800 nm. As used herein, the term "about" or "approximately" means plus or minus 10% of the stated value. FIG. 7 shows absorption and emission spectra of another type of phosphor. As illustrated, the phosphor exhibits strong absorption 100 between about 540 nm and 700 nm. The data display screens of smart devices typically produce full-color images by combining various levels of red, blue and green light. Red light, as seen by the human eye, has a wavelength of between approximately 620 nm and approximately 750 nm, so a light emitting smart device, such as a smart phone, with a data display screen comprising red emitters, typically LEDs, would be suitable for excitation of this phosphor. Blue light (approximately 450 nm-495 nm) and green light (approximately 495 nm-570 nm) could also be functional in this system with this phosphor to produce SWIR emission. Most incandescent light sources would also be suitable for excitation of the phosphor.

The term "phosphors", as used herein, also includes engineered fluorescers such as "quantum dots."

Figure 8:
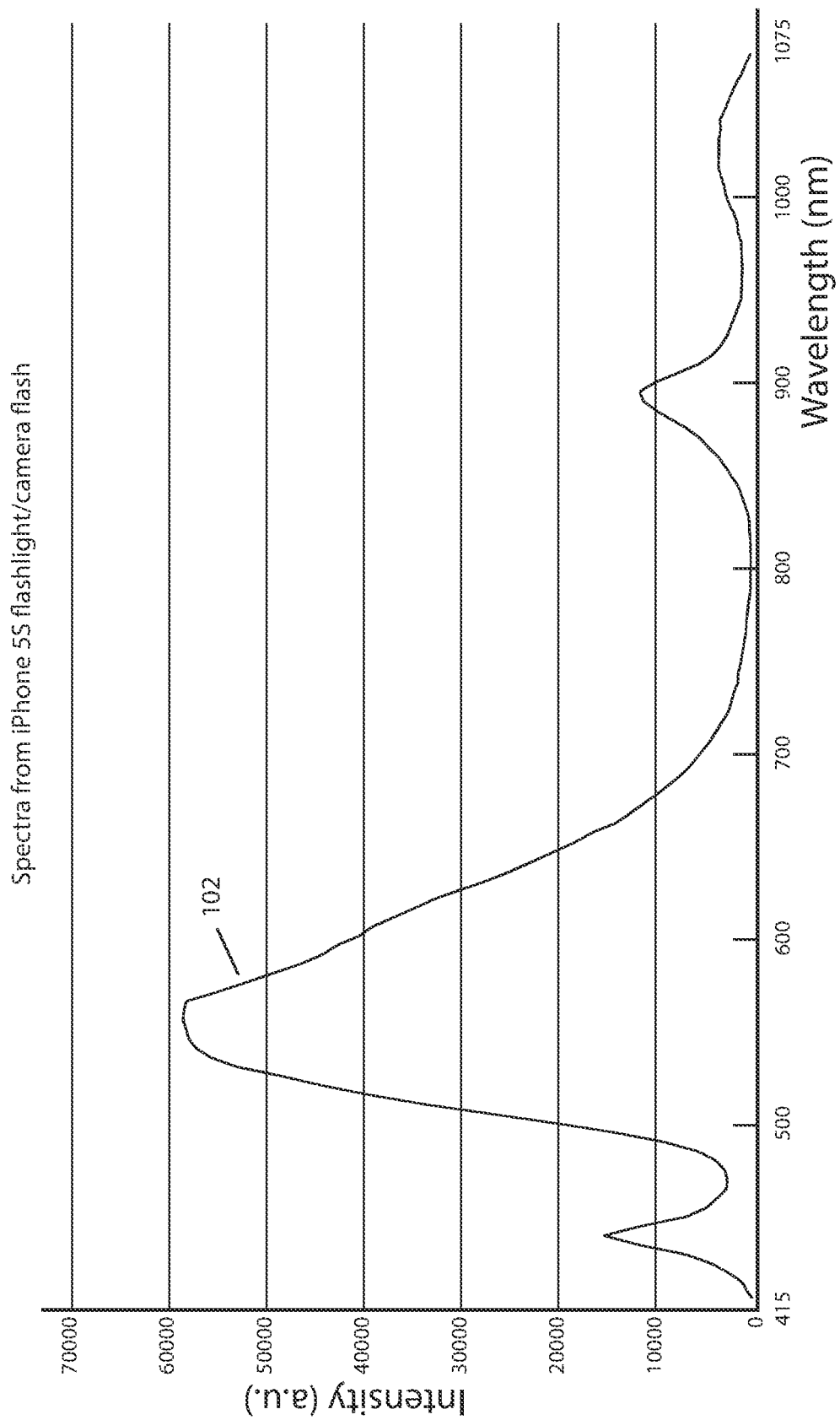
FIG. 8 is a spectra of a white light illuminator from an Apple iPhone 5S camera flash.

Many smart phones and other devices now have built-in cameras. In addition to the relatively low power LEDs in the data display screen, these devices also have built-in "white light" illuminators to provide light to the scene to be photographed. These light sources are most commonly very bright "white" LEDs. This light is rich in visible red light, as well as light of other wavelengths that can effectively excite a SWIR emitting phosphor. The spectra 102 of the white light illuminator in an Apple iPhone 5S camera flash is shown in FIG. 8 (emission spectra from a typical smart phone device). It can be seen from FIG. 7 and FIG. 8 that the light emitted by the iPhone camera flash contains light wavelengths that are within the excitation band of the phosphor. Since these white light emitters are exceptionally bright, they can be effectively used to excite a SWIR emitting phosphor, thereby producing high levels of emission from the SWIR phosphor. Of course, light emitters of low intensity may also be employed for this purpose.

Figure 3A:
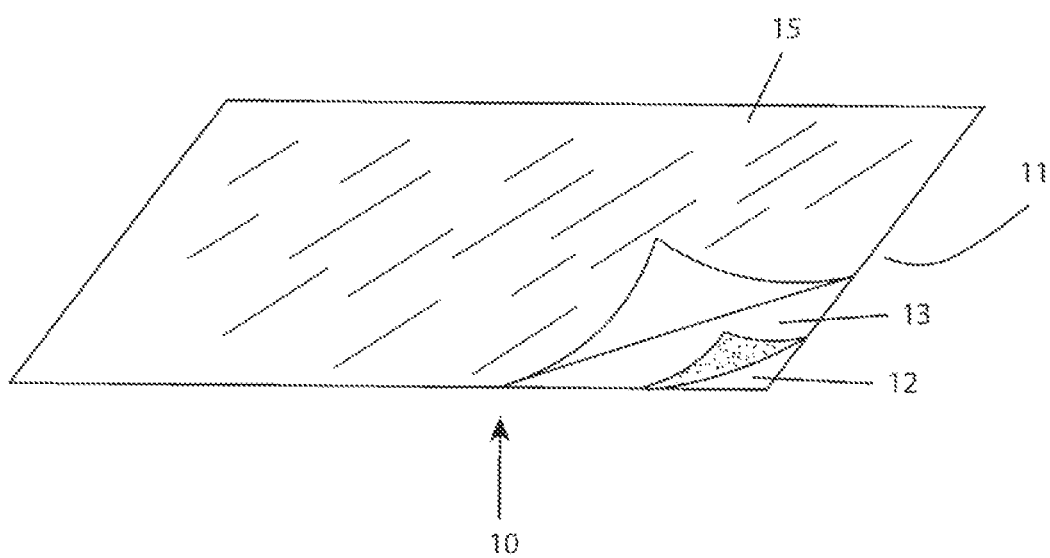
FIG. 3A illustrates the SWIR tape in a trimmable sheet form that can be fitted over a light emitting device, with the layers shown peeled back for clarity.
Figure 9:
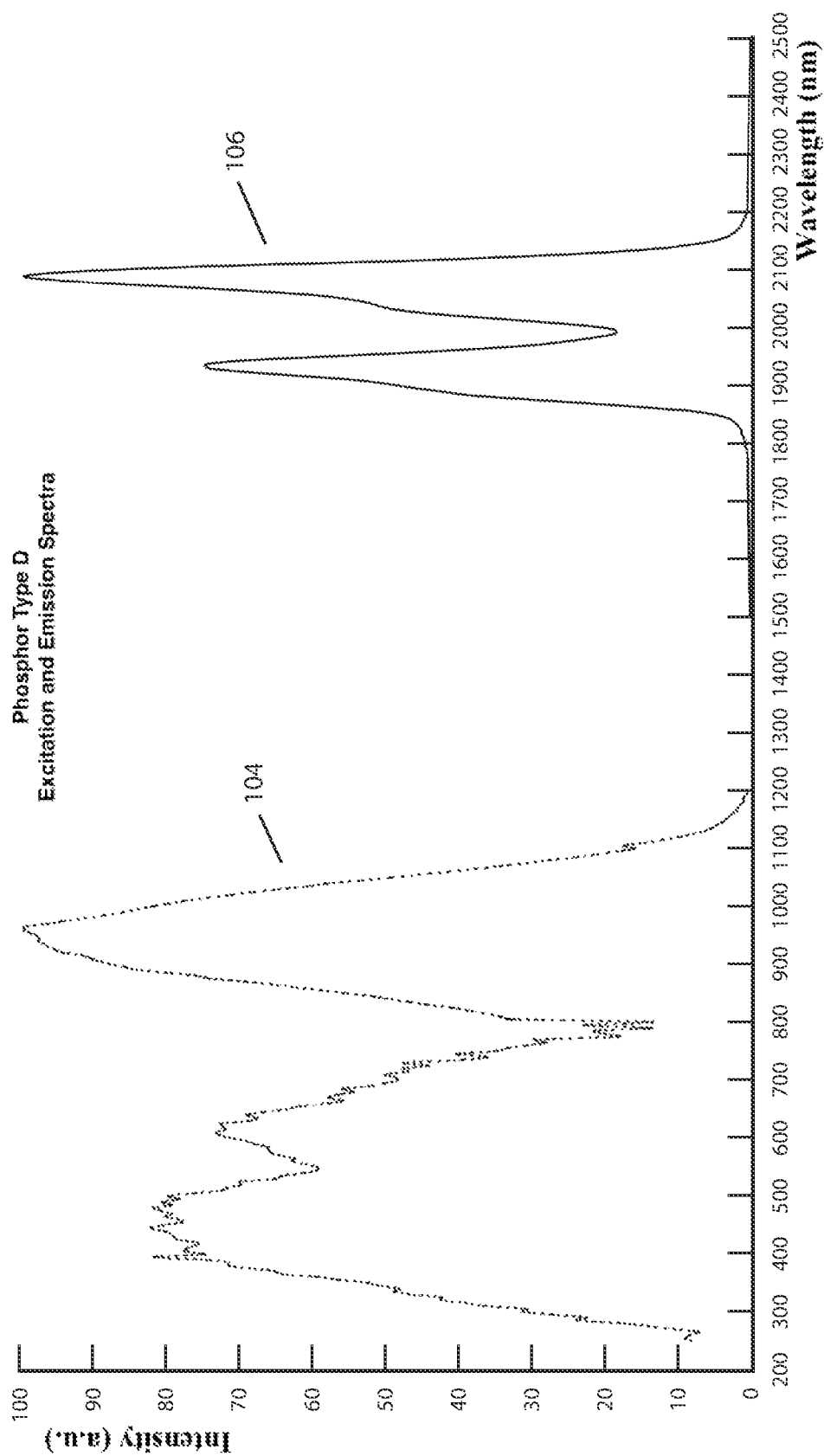
FIG. 9 illustrates an absorption and emission spectra of a phosphor that exhibits strong absorption between about 240 nm and about 1200 nm, and emission between about 1760 nm and about 2220 nm.

FIG. 9 shows absorption and emission spectra of another type of phosphor. Illustrated in FIG. 3A is an illustrative example of a phosphor that exhibits strong absorption 104 between about 240 nm and about 1200 nm, and emission 106 between about 1760 nm and about 2220 nm.

Figure 10:
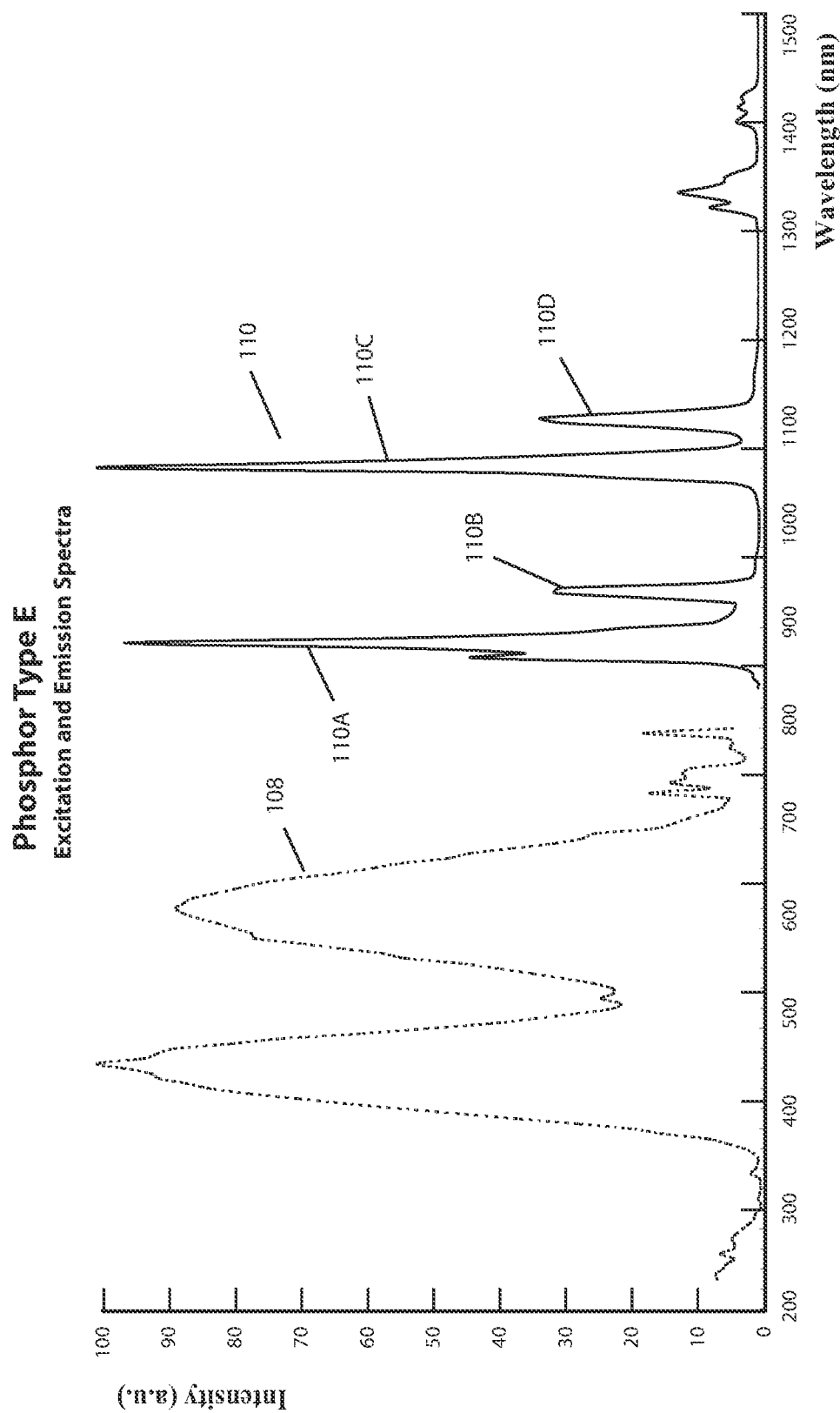
FIG. 10 illustrates an absorption and emission spectra of a phosphor that exhibits strong absorption between about 380 nm and about 800 nm, and desired emission between about 1040 nm and about 1140 nm.

FIG. 10 shows absorption and emission spectra of another type of phosphor. Illustrated in FIG. 10 is an illustrative example of a phosphor that exhibits strong absorption 108 between about 380 nm and about 800 nm, and desired emission 110 between about 1040 nm and about 1140 nm.

Preferably, the SWIR energy system or material 10 is designed to produce a SWIR energy emitting source that does not also produce visible or NIR emission; it is desirable that any visible or NIR emissions be blocked with a suitable electromagnetic energy blocking member, such as a filter. The filter, preferably, is at least partially transparent to the SWIR energy of interest, so that this energy may be usefully emitted from the device. A selective wavelength filter element may be created using a combination of organic or other dyes, such as anthraquinones, dianthrones, cyanines, heteroaromatics, metal dithiolenes, perylenes, phthalocyanines, rhodamines, tetraaryldiamines, thiazines, triarylamines, or triarylmethanes. The dyes may be incorporated into a substrate or carrier, such as a plastic resin, including plastisol, organisol, or other materials which will form a "solid solution" in which the dye is efficiently dispersed. The dyes and any support resin must permit the transmission of SWIR energy so that useful energy can leave the device. As an alternate to a dyed filter, a thin-film filter, such as a dielectric filter, may be utilized to block visible and NIR energy while permitting the SWIR energy to pass. A combination of these and other filter types may also be advantageously employed.

Alternatively, the SWIR energy system or material 10 may be configured to either block, pass or partially attenuate any desired portion of the energy in the near-infrared (NIR), ultraviolet (UV) or visible energy bands, or any combinations therefore. For example, if a dual band, SWIR/NIR energy source is desired, the SWIR energy system or material 10 may be configured to allow a portion of the excitation light source to "leak through" the light blocking filter so that a dual band, SWIR/NIR energy source can be produced. The optical density of the various energy bands in the system may be adjusted by controlling the relative concentration of the dye(s) utilized in the energy blocking elements of the invention. In this example, if the NIR energy was detected and imaged on an image-intensification type (night vision goggles) imager, only a relatively small percentage of NIR energy would need to be passed through the energy blocking layer to be visible to the goggles, as current generation III night-vision goggles can have gains in excess of 40,000.

In an alternative example, the SWIR energy system or material 10 may be configured to provide an energy source with a high percentage of visible light and a relatively low percentage of SWIR energy, such as might be desired for SWIR visible, LED vehicle headlights, a relatively low quantity of energy conversion phosphor and visible light blocking materials can be utilized. The exact percentage of NIR excitation energy that is desired to be passed through the light blocking member can be adjusted to less than 0.01% to greater than 99%, depending on the selection and relative concentrations and scattering nature of the energy blocking dyes and the phosphor or other wavelength converting material employed. Suitable wavelength blocking dyes include Cyanines, Triarylmethanes and so forth. The precise percentage of blocking effect may be adjusted by controlling the thickness and/or concentration of blocking dyes in the energy blocking layer as well as the concentration (optical cross-section) of the phosphor or other wavelength converting material. The "leaky energy source" previously described need not have the same "leakiness" across any particular energy band. For example, it may be desirable to let a substantial portion of energy between 1000-1200 nanometers pass through the invention but sharply attenuate energy in the 1200-1300 nanometer range. This may be accomplished by careful selection and controlled concentrations of various energy blocking dyes or finely-dispersed pigments.

The exact texture, appearance, flexibility and durability of the SWIR energy system or material 10 may be adjusted as may be desired by altering the materials of construction of the substrate 12, the phosphor layer 13, or the VIS/NIR blocking filter 15. For example, if an extremely flexible item is desired, solvents or plasticizers may be added to any of these layers to increase their flexibility. The solvents must, of course, be compatible with the chemistry of the base materials. For example, if a PVC resin forms the base material of a structural layer, it may be "softened" by the addition of a solvent such as Triethyl Citrate, Butyl Benzoate, DINP or other well-known plasticizers. If it is desired to increase the tear-strength of any of these layers, a structurant, such as glass or polyester fibers, may be incorporated into the layer, said fibers serving to increase the tensile strength of the layer.

Similarly, if it is desired to impart a "pebbled" appearance to the invention, the surface layer (opposite any adhesive layer) may be mechanically mottled to render a patterned surface. The surface appearance may also be altered by the addition of non-dissolving or partially-dissolving materials that produce the desired surface appearance. An example of this is the incorporation of small glass, plastic or other beads that reside on or just below the surface of the layer to which the appearance is to be modified. The shape of the bead may be permitted to "show through" the outermost surface of the invention, even though it may be overcoated with, for example, a blocking dye layer, in a manner in which the surface takes on the approximate texture but not the color of the beads. The beads or other structures may also reside either partially or completely on the outer surface of the layer as long as they do not significantly hinder the other desired function of the invention, that being to emit the desired spectral energies.

The SWIR energy system or material 10 then comprises a light-weight and convenient mechanism of producing SWIR energy from existing electromagnet energy sources, preferably visible or ultra-violet energy sources.

Adhesive and Substrate

Preferably, the adhesive and substrate may exhibit elastic/flexible properties so as to be stretched, without ripping or cracking, to fit a desired surface. The substrate should be readily bondable to the phosphor layer. An illustrative example may be the commercially available adhesive 764 tape manufactured by 3M Company (formally known as Minnesota Mining and Manufacturing Company, Maplewood, Minn.). The 764 tape is a 0.005" thick, flexible vinyl tape, employing a rubber-based adhesive. Because this tape is somewhat elastic, it can be stretched to permit conformation to warped or irregular surfaces. The 764 tape also provides a good substrate to bond the phosphor layer. Other substrates may also be employed for this purpose. Suitable substrates include, but are not limited to, polyesters, urethanes, olefins, styrenics, sarans, acetals, fluorinated polymers, butyrates, cellulosics (i.e. cellulose nitrate), acrylics and various natural and synthetic rubbers.

Similarly, suitable adhesives may include, but are not limited to, any of the natural or synthetic adhesives, for example: rubbers, acrylics, animal and plant-derived proteins, gums or starches and waxes. Hot-melt-adhesives, such as those based on Ethylene-vinyl-acetates are also anticipated by this invention. Epoxies, polyesters, urethanes, ionomers as well as UV curable adhesives are also anticipated in this invention. Removable, re-positionable and non-removable adhesives are anticipated in this invention as well.

Accordingly, the substrate must not disintegrate when the phosphor and/or the VIS/NIR blocker is/are applied, or have a low surface energy such that the phosphor layer does not bond thereto.

Electromagnetic Energy Blocking Member: VIS/NIR Filter

An illustrative example of an effective electromagnetic energy blocking member is a visible light/near infrared (VIS/NIR) filter that was created using a commercial product referred to as SPECTRE™ 160 (visibly-opaque IR transmitting (VOIRT) screen ink, which absorbs 200-1065 nm, and transmits >1165 nm), available from Epolin, Inc. (Newark, New Jersey). The SPECTRE™ 160 was supplied in the form of an air dry, viscous ink that could be screen printed, or, alternately, applied in a controlled thickness layer by the use of doctor blades. In an illustrative example, the VIS/NIR filter layer was applied directly over the phosphor layer. After curing, the preferred thicknesses of the filter layer were between 0.0005" to about 0.020", although other thicknesses worked as well.

A second (dye) product EPOLIGHT™ 7527G (visible opaque dye, blocks light from 200 nm to 1065 nm), also from Epolin, can be used to produce a suitable VIS/NIR filter. This dye was supplied as a powder, and used by incorporating it into a suitable carrier which serves to both disperse the dye and bond it to a substrate, typically the phosphor layer. A suitable carrier may be, for example, a solvent-based, SWIR transparent, paint base. One suitable base is S226 from Nazdar (Shawnee, Kans.).

Phosphor Layer

Phosphors emitting SWIR when excited with visible or ultraviolet light are preferred. For SWIR photoluminescence, one or more lanthanide ions ($Ln^{3+}$) may be used, see Liang, et al., *J. Mater Chem C*, 2017, 5, 6488. The phosphor layer may be designed to contain the phosphor in a binder/carrier. A preferred, albeit not limiting, binder/carrier utilized was product 3426, a UV cured urethane-based ink base from Nazdar (Shawnee, Kans.). This type of material provided good transparency to the excitation light and bonded exceptionally well to a variety of substrates, including 3M's 764 product. The material is tough and flexible after curing, allowing the finished product to be stretched and flexed without damage. It was found that the bond between the 3426 and the 764 products was both a mechanical bond and a chemical bond. Preferably, the dry powdered phosphor was mixed into the un-cured urethane product at concentrations of about 0.5% (W/W) to concentrations of about 50% (W/W), depending on the SWIR conversion efficiency and SWIR output desired for any given application to form a slurry. The slurry was then deposited onto the substrate, for example 3M product 764, in a controlled thickness, and later cured by application of ultraviolet light. After curing, a preferred, albeit not limiting, thickness of between 0.001" to about 0.080" was determined to be functional for the application.

A particularly functional form of the SWIR energy system or material 10 comprises a base material utilizing Orajet 3951A from Orafol (Avon, Conn.), and a phosphor layer comprising Nazdar S226 ink base into which powdered phosphor had been admixed. The VIS/NIR blocking filter comprised Nazdar S226 into which EPOLIGHT 7527G had been thoroughly dispersed. The phosphor layer comprised a mixture containing approximately 40% phosphor, 40% S226, and 15-25%, preferably 20%, triethyl citrate (TEC) weight to weight. The TEC in this formulation functions as a plasticizer to improve the elongation property of the phosphor layer, thus preventing any cracking that would allow other energy sources to be exposed. Other plasticizers, such as benzoates, adipates, and citrates, may be employed as well. This material was deposited on the base material utilizing doctor blades to yield a wet thickness of approximately 0.005". The product was then cured in an oven at 168° F. for 12 minutes. The product was removed from the oven and allowed to cool to room temperature.

The VIS/NIR blocking filter comprised a mixture containing approximately 2% 7527G dye, 78% S226, and 15-25%, preferably 20%, triethyl citrate (TEC) weight to weight. This material was deposited on the previously produced phosphor layer utilizing doctor blades to yield a wet thickness of approximately 0.003". This VIS/NIR blocking filter layer was cured in an oven at 168° F. for 12 minutes. Two more VIS/NIR blocking layers were added to the first layer using the same deposition and curing process, resulting in a total VIS/NIR blocking filter layer thickness of approximately 0.009". The foregoing example is exemplary only, and variations with respect to layer composition and thickness are anticipated by this invention. This arrangement of materials was found to yield a product which was tough, elastic, and highly effective at converting visible light to SWIR energy, while blocking undesirable VIS/NIR energy. The precise thickness of both layers applied to the substrate can be adjusted as may be desired for optimal function for a particular application.

Alternative, but not limiting, embodiments may incorporate the light-blocking materials into carriers such as Styrenic Block Copolymers (SBC), for example KRATON polymers (Kraton Corporation, Houston, Tex.) for use as the SWIR producing layer. Alternately, other Thermoplastic Elastomers (TPE) and Metallocene Catalyzed Olefins, such as Metallocene Catalyzed Polyethylene, (MPE) may be employed for this purpose. Urethane polymers can also be employed for this purpose. The degree of flexibility of the structure may be adjusted by selection and ratios of the polymers and any solvents or plasticizers to be added.

Ultraviolet light stabilizers and UV absorbers such as but not limited to the TINUVIN light absorbers and hindered-amine stabilizers series from BASF can be employed to block ultraviolet light from degrading the light blocking dyes and or the polymer structures in which they are incorporated. Surface sheen may be adjusted from shiny to dull matte by the addition of products such as but not limited to IMSIL, microcrystalline silica, from Covia Corporation or CAB-O-SIL, fumed silica, from Cabot Corporation. Surface sheen may also be controlled by the formation of a micro-textured surface on the outermost layer of the invention. Dust affinity may be controlled by incorporation of an antistatic agent or additive such as but not limited to IRGASTAT, an ethoxylated stearyl amine used as an anti-static, anti-dust agent or additive from BASF.

EXAMPLES

Figure 2A:
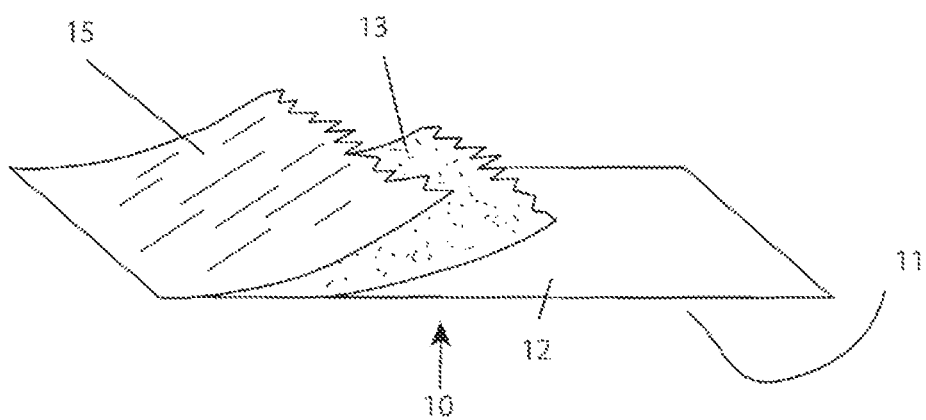
FIG. 2A is a perspective view of the SWIR emitting tape, showing individual layers.
Figure 2B:
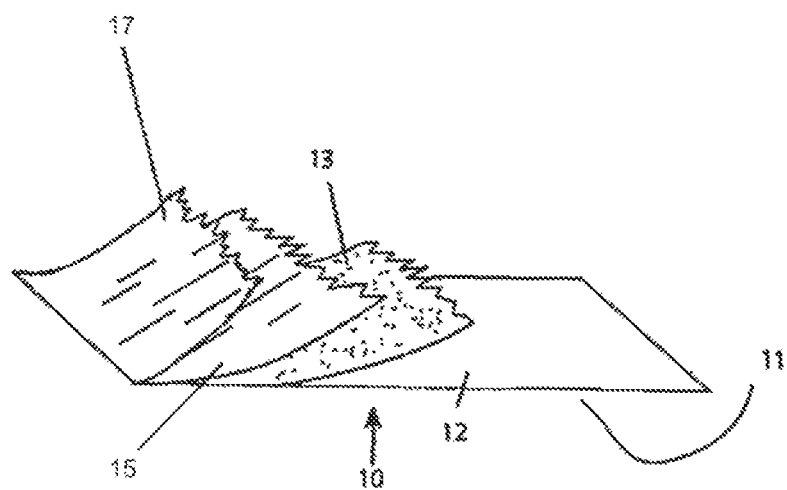
FIG. 2B is a perspective view of the SWIR emitting tape, illustrating an optional top most fourth layer.

Referring to FIGS. 1-2B, a short wavelength infrared (SWIR) energy emitting system that can be conveniently utilized to produce SWIR energy from existing light emitting items (SWIR energy system or material 10) is shown. The SWIR energy system or material 10 is illustrated as a tape form. As illustrated in FIG. 2A, the SWIR energy system or material tape 10 may comprise one or more of an adhesive attachment member 11, a substrate 12, phosphor 13, and an electromagnetic energy blocking member, illustrated herein as a VIS/NIR blocking filter 15.

In the embodiment illustrated, the short wavelength infrared (SWIR) energy emitting system or material (tape) 10 for producing SWIR energy from an emission source emitting electromagnetic energy provides a phosphor material layer 13; an electromagnetic energy blocking layer 15 located on or applied to the phosphor material layer 13, the electromagnetic energy blocking layer configured to block emissions of NIR energy, or NIR and visible energy; a flexible or elastic substrate 12 for delivering the short wavelength infrared (SWIR) energy emitting system or material 10 to an emission source emitting electromagnetic energy, said flexible or elastic substrate configured to be stretched to fit a desired surface comprising an emission source emitting electromagnetic energy; the phosphor material layer 13 is located on or applied to the flexible or elastic substrate 12. The attachment member may be an adhesive, such as a pressure sensitive adhesive. The adhesive material or layer 11 may be located or layered on a side of the flexible or elastic substrate 12 which is opposite of the phosphor material layer 13.

The VIS/NIR blocking filter or layer 15 may also be configured to block actinic energy such as ultraviolet light. In addition to or separately, the VIS/NIR blocking filter or layer 15 may also contain one or more compounds or materials that control surface sheen, reduce tackiness or blocking, provide scratch resistance to the subsequent layers, or reduce the affinity of the SWIR energy system or material 10 to attract and hold dust and debris.

Alternatively, the SWIR energy system or material 10 may be configured with a fourth layer 17, referred to as a surface functional layer or surface characteristic layer 17, in the form of a layer situated on or an admixture incorporated into, added to, or in place of the VIS/NIR blocking layer 15, see FIG. 2B. This additional fourth layer/additive has one or more of the functions of blocking actinic energy i.e. UV light, controlling surface sheen, reducing tackiness or blocking, or providing scratch resistance to the subsequent layers, or reducing the affinity of the invention to attract and hold dust and debris.

For example, considering surface sheen, a plastic surface which measures <10GU (Gloss Units) when measured at an angle of 85° is considered to be a matte surface. ASTM method D523 is one suitable method to determine GU of a surface. A GU value of 5 or less can be considered a "flat" surface. Such a surface is desirable if specular reflections from the surface are to be minimized. Without being limiting, IMSIL A-100 or IMSIL A-75 represent two additives (silica fillers) that may be beneficially employed to reduce the surface sheen of the VIS/NIR blocking layer so that a matte surface may be produced. A preferred concentration to produce a flat surface finish is to incorporate between about 38% to about 80% pigment (i.e.: solids, in this example IMSIL A-100) to the total mass of the structure. Put another way, approximately 3.8 grams of IMSIL A-100 would be combined with approximately 6.2 grams of binder, for example, S-226, to produce approximately 10 grams of product. A concentration of 12% to 35% solids produces a less-flat, but functional product. In both of these examples, the exact percentages can vary depending on the desired results and any other materials to be added, such as blocking dyes.

The SWIR energy system or material tape 10 may take any size and shape as may be desired. The SWIR energy system or material tape 10 may be tearable or cuttable so that a portion of the tape may readily be detached from the roll for use. The SWIR energy system or material tape 10 may also incorporate scoring or perforations to aid in portioning the tape.

The adhesive attachment member 11, preferably comprising a pressure-sensitive adhesive, permits the SWIR energy system or material tape 10 to be conveniently attached to a light emitting device, such as a smart phone camera flash or other light emitting source. The VIS/NIR blocking filter 15 prevents undesirable visible light, and any NIR energy that may be present, from being emitted from the SWIR energy system or material tape 10. The functionality of these features may be combined with other features; for example, phosphor 13 may comprise an adhesive agent that serves to bond substrate 12 and VIS/NIR blocking filter 15 together. The phosphor 13 may be in the form of a slurry, paste, paint or ink which is directly deposited on the substrate 12 by brushing, rolling, screen-printing or any known process. A preferred method of producing the VIS/NIR blocking filter 15 employs dyes in a solvent-based ink or paint. Likewise, the VIS/NIR blocking filter 15 may be in the form of a slurry, paste, paint or ink, which is then deposited onto the layer produced by phosphor 13. Alternately, one or both of these layers may be applied in the form of a dry powder that is fused into the surface of a substrate. The phosphor 13 and/or the VIS/NIR blocking filter 15 may also be in the form of a cast, molded, extruded or otherwise produced member, so long as the functionality of these elements are preserved.

Figure 3B:
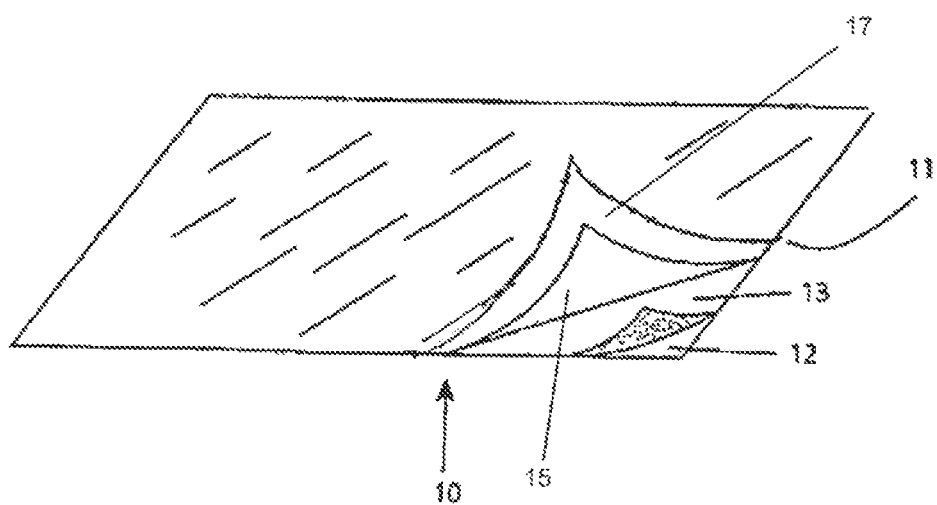
FIG. 3B illustrates the SWIR tape in a trimmable sheet form that can be fitted over a light emitting device with an optional top most fourth layer; with the layers shown peeled back for clarity.

FIGS. 3A and 3B illustrate a version of the SWIR energy system or material tape 10 in sheet form. Such a sheet comprises a similar structure to the SWIR energy system or material tape 10 described above, but may have dimensions to provide a device which emits electromagnetic energy, preferably visible light or ultraviolet light, such as an automobile headlight or other large light emitter, to be easily covered, potentially, by a single sheet. The SWIR energy system or material sheet 10 comprises a phosphor 13, a VIS/NIR blocking filter 15 and, preferably, an adhesive attachment member 11. As described above for the tape form, the sheet embodiment illustrated, may provide a phosphor material layer 13; an electromagnetic energy blocking layer 15 located on or applied to the phosphor material layer 13, the electromagnetic energy blocking layer 15 configured to block emissions of NIR energy, or NIR and visible energy; a flexible or elastic substrate 12 for delivering the short wavelength infrared (SWIR) energy emitting system or material 10 to an emission source emitting electromagnetic energy, said flexible or elastic substrate configured to be stretched to fit a desired surface comprising an emission source emitting electromagnetic energy; the phosphor material layer 13 is located on or applied to the flexible or elastic substrate 12. The attachment member may be an adhesive, such as a pressure sensitive adhesive. The adhesive material or layer 11 may be located or layered on a side of the flexible or elastic substrate 12 which is opposite of the phosphor material layer 13.

The VIS/NIR blocking filter or layer 15 may also be configured to block actinic energy such as ultraviolet light. In addition to or separately, the VIS/NIR blocking filter or layer 15 may also contain one or more compounds or materials that control surface sheen, reduce tackiness or blocking, provide scratch resistance to the subsequent layers, or reduce the affinity of the SWIR energy system or material 10 to attract and hold dust and debris.

Alternatively, the SWIR energy system or material 10 may be configured with a fourth layer 17, in the form of a layer situated on or an admixture incorporated into, added to, or in place of the VIS/NIR blocking layer, see FIG. 3B. This additional fourth layer/additive has one or more of the functions of blocking actinic energy i.e. UV light, controlling surface sheen, reducing tackiness or blocking, providing scratch resistance to the subsequent layers, or reducing the affinity of the invention to attract and hold dust and debris. For example, considering surface sheen, a plastic surface which measures <10GU (Gloss Units) when measured at an angle of 85° is considered to be a matte surface. ASTM method D523 is one suitable method to determine GU of a surface. A GU value of 5 or less can be considered a "flat" surface. Such a surface is desirable if specular reflections from the surface are to be minimized. Without being limiting, IMSIL A-100 or IMSIL A-75 represent two additives (silica fillers) that may be beneficially employed to reduce the surface sheen of the VIS/NIR blocking layer so that a matte surface may be produced. A preferred concentration to produce a flat surface finish is to incorporate between about 38% to about 80% pigment (i.e.: solids, in this example IMSIL A-100) to the total mass of the structure. Put another way, approximately 3.8 grams of IMSIL A-100 would be combined with approximately 6.2 grams of binder, for example, S-226, to produce approximately 10 grams of product. A concentration of 12% to 35% solids produces a less-flat, but functional product. In both of these examples, the exact percentages can vary depending on the desired results and any other materials to be added, such as blocking dyes.

The adhesive attachment member 11 may also incorporate a substrate 12 to provide a durable structure for the system.

In either example of the tape or sheet, the short wavelength infrared (SWIR) energy emitting system or material 10 for producing SWIR energy from an emission source emitting electromagnetic energy, may be configured to either block, pass or partially attenuate any desired portion of the energy in the near-infrared, ultraviolet or visible energy bands.

The SWIR energy system or material 10 may be configured to provide NIR blocking or attenuation between 1% to 99.9999999%. In one embodiment, the NIR blocking or attenuation may be between 5%-95%; between 10%-90%; between 15%-85%; between 20%-80%; between 25%-75%; between 30%-70%, between 35%-65%; between 40%-60%. In one embodiment, the NIR blocking or attenuation may be 10%, 15%, 20%, 25%, 30%, 35%, 40%, 45%, 50%, 55%, 60%, 65%, 70%, 75%, 80%, 85% 90%, 95%, 99%, or 99.9999999%.

The SWIR energy system or material 10 may be configured to provide visible light blocking or attenuation between 1% to 99.9999999%. In one embodiment, the visible light blocking or attenuation may be between 5%-95%; between 10%-90%; between 15%-85%; between 20%-80%; between 25%-75%; between 30%-70%, between 35%-65%; between 40%-60%. In one embodiment, the visible light blocking or attenuation may be 10%, 15%, 20%, 25%, 30%, 35%, 40%, 45%, 50%, 55%, 60%, 65%, 70%, 75%, 80%, 85% 90%, 95%, 99%, or 99.9999999%.

The SWIR energy system or material 10 may be configured to provide UV light blocking or attenuation of between 0.1% to 99.9999999%. In one embodiment, the actinic energy, such as UV light blocking or attenuation may be between 5%-95%; between 10%-90%; between 15%-85%; between 20%-80%; between 25%-75%; between 30%-70%, between 35%-65%; between 40%-60%. In one embodiment, the UV light blocking or attenuation may be 10%, 15%, 20%, 25%, 30%, 35%, 40%, 45%, 50%, 55%, 60%, 65%, 70%, 75%, 80%, 85% 90%, 95%, 99%, or 99.9999999%.

The SWIR energy system or material 10 may be configured to prevent actinic light, such as UV light, from entering or degrading one or more portions of the SWIR energy system or material 10, i.e. one or more of the individual layers by blocking or allowing 1% to 99.9999999% actinic energy to contact one or more of the one or more portions of the SWIR energy system or material 10. In one embodiment, between 5%-95%; between 10%-90%; between 15%-85%; between 20%-80%; between 25%-75%; between 30%-70%, between 35%-65%; between 40%-60% of the actinic energy may contact one or more portions of the SWIR energy system or material 10. In one embodiment, 10%, 15%, 20%, 25%, 30%, 35%, 40%, 45%, 50%, 55%, 60%, 65%, 70%, 75%, 80%, 85% 90%, 95%, 99%, or 99.9999999% of the actinic energy may contact one or more portions of the SWIR energy system or material 10.

While the above paragraph describes specific blockage or pass through percentages for the individual energy sources of NIR, visible light, and actinic energy, such as UV, the SWIR energy system or material 10 may be configured to provide blocking or pass through or partially attenuate for all three or any two, in any of the above listed blockage/pass through percentages. That is, in an illustrative example, the SWIR energy system or material 10 may be configured to block 100% NIR, 95% visible light and 95% UV light, or 95% NIR, 100% visible or UV light.

Figure 4:
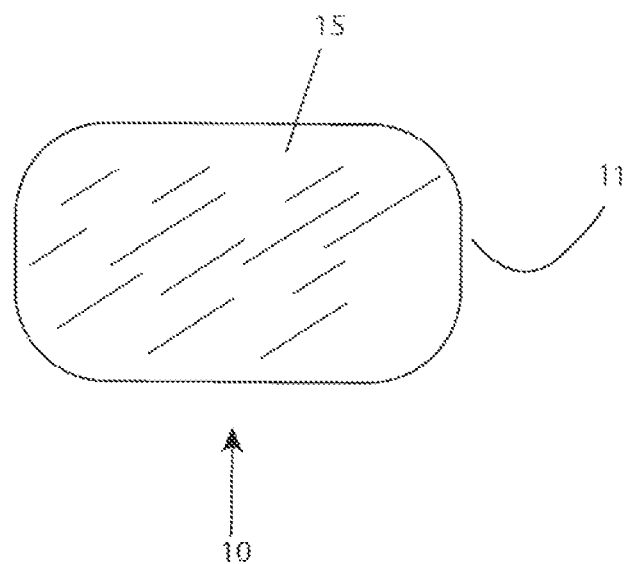
FIG. 4 represents the SWIR emitting tape shown as pre-cut or otherwise manufactured to a pre-determined size or shape.

FIG. 4 illustrates an embodiment of the SWIR energy system or material 10, showing a SWIR emitting tape that has been pre-cut or otherwise manufactured to a pre-determined size or shape. In the example for use with a smart phone, the tape has been die-cut to be of a size and shape to fit over the camera flash of a smart phone.

Figure 5:
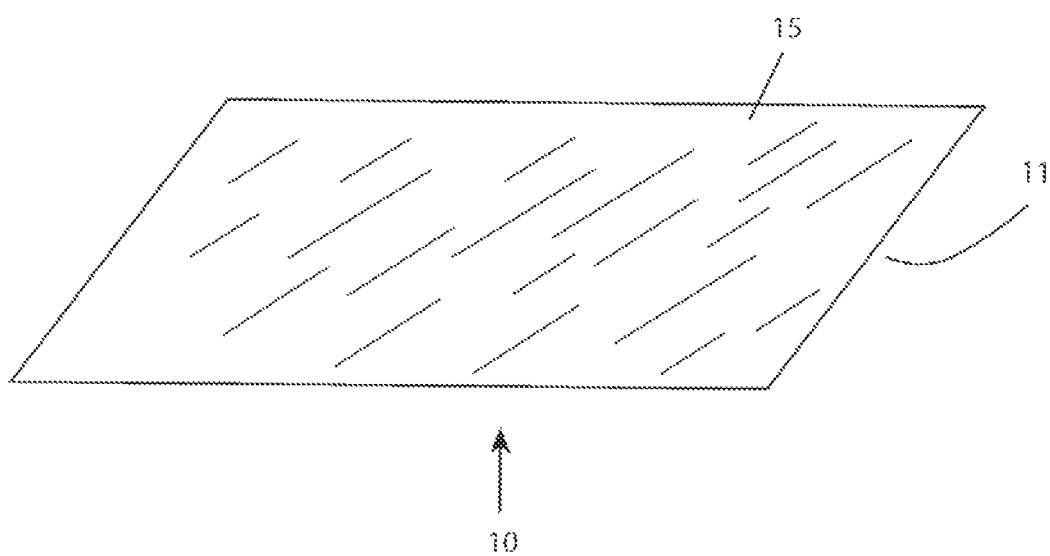
FIG. 5 illustrates the SWIR transmissive tape with the SWIR conversion layer omitted.

FIG. 5 shows a form of the SWIR energy system or material tape 10 in which the phosphor layer has been omitted. Since many visible light sources, such as incandescent sources, also produce SWIR energy, an effective SWIR emitter that does not emit visible or NIR energy can be produced by application of an optical filter that blocks the VIS/NIR, but permits the passage of SWIR energy. An integral adhesive attachment member permits convenient attachment to the visible light source.

Figure 6:
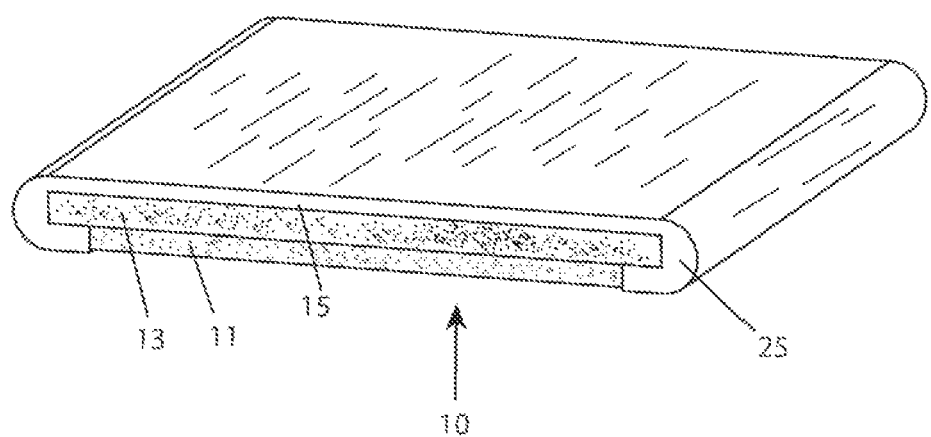
FIG. 6 illustrates the SWIR tape with an embodiment for preventing undesired lateral light emission.

FIG. 6 illustrates a form of the SWIR energy system or material tape 10 in which stray lateral VIS/NIR emission from the edges of the SWIR energy system or material tape 10 is eliminated by using an optical barrier. In this embodiment, a lateral light blocker 25 is formed as an extension of the VIS/NIR blocking filter 15. This filter is wider than the phosphor 13, and is wrapped around the edges of the SWIR energy system or material tape 10, where it may be held in place by adhesive 11. Any light attempting to emanate laterally, either via the adhesive 11, the substrate layer 12, or any other layer, is then blocked by this lateral light blocker. The same objective may be achieved by the application of a coating to the edges of the SWIR energy system or material tape 10, such as a paint, or a strip of tape that is opaque to the VIS/NIR light to be blocked. The SWIR energy system or material tape 10 may further contain scoring, perforations, or the like to permit a controlled portion of the tape to be readily detached from the remainder of the tape.

The SWIR energy system or material tape 10 may further contain a mechanism to render the SWIR energy system or material tape 10 useless to secondary users. Such mechanisms include, but are not limited to, dissolvable substrates, for example gelatins, starches or water-soluble polyethylene oxides. The SWIR energy system or material tape 10 may also be rendered useless to secondary users by permitting the light blocking layer to be readily separated from the phosphor layer so that they may be disposed of separately, thereby making reuse unlikely. The SWIR energy system or material tape 10 may also be rendered useless by controlled disintegration through the application of highly frangible substrates, such as gelatins, cellulosics, or suspensions containing a high percentage of particulate solid matter. Additionally, disintegration agents, such as those employed in the medical pill industry, may be employed to further the tape's destruction upon exposure to water. The application of photo-sensitive materials that render the SWIR energy system or material tape 10 useless upon extended exposure to actinic light may also be employed for this propose. Such materials include VIS/NIR blockers comprising unstable dyes that lose their ability to block VIS/NIR when exposed to actinic light. Other materials that may be employed for this purpose include polymers that disintegrate upon exposure to actinic light, thereby causing the structure of the system to fall apart. Common animal gelatins, or cellulosics such as wood flour, when used in sufficient quantity (about 5-25% W/W) can yield a highly frangible product, in that they do not become plasticized in the solvents and/or plasticizers used in the phosphor layer or the VIS/NIR blockage layer, and therefore yield weak structures that are susceptible to disintegration when flexed, such as upon removal from an object to which the structure is adhered to. Products such as microcrystalline cellulose (MCC) may also be advantageously employed for this purpose. This material is highly hygroscopic and exhibits swelling upon exposure to water, with the swelling literally pushing the product apart and rendering it useless. The exact percentage of the above materials with respect to the phosphor layer and/or the light blocking layer is dependent on the speed at which product destruction is desired and the ambient conditions in which it will be used. Since, in the case of the use of microcrystalline cellulose, disintegration occurs when the MCC is hydrated, it must be incorporated in a manner that will permit water to reach the MCC. A convenient means to achieve this is to incorporate the MCC as a tie layer between the phosphor layer and the light blocking layers. Upon exposure to water, the two layers will separate. Scorings, tear initiators or other mechanical weak links that cause the tape to disintegrate upon the tape's removal from the original surface may also be employed to frustrate re-use of the tape.

The SWIR emitting system or material 10 may be used as an identifying unit having a unique or identifying spectra fingerprint. In this embodiment, the SWIR emitting system or material 10 may be configured to employ a plurality of dyes or other energy blocking agents in one or more of the layers, preferably the top layer, so that the spectral emission of the SWIR emitting system or material 10 can be controlled. Accordingly, the SWIR emitting system or material 10 may be configured to allow one or more wavelengths of the spectra emission to pass though. The one or more spectra emissions that are allowed to go through or be blocked would then create a unique spectral fingerprint, having a known pattern that could be used to identify the device associated with the SWIR emitting system or material 10 emitting that pattern.

The SWIR emitting system or material 10 may include one or more of the dyes, as described above, which may, or may not, be overlapping in their absorption spectra. For example, in a practical application, it may be desired to emit energy at a plurality of wavelengths, either visible, invisible or combinations thereof. The energy emission wavelengths emitted would be pre-determined and therefore, readily identifiable. Such a system would find value if an IFF (Identity Friend or Foe) system were to be employed that matched these pre-determined wavelength emissions against a reference standard of the energy emitting entity.

Referring back to FIG. 10, absorption and emission spectra illustrates four dominant emission peaks, referred to as a whole 110, and to individual peaks as 110A, 110B, 110C and 110D. The individual peaks labeled as 110A, 110B, 110C and 110D have corresponding wavelengths of approximately 880 nm, 940 nm, 1070 nm and 1120 nm respectively. By selectively attenuating one or more of these peaks, useful information can be transmitted, thus creating the spectra fingerprint. For example, if a dye is employed to at least partially block the emission at 880 nm (110A), such an emission is readily differentiated from the emission spectra in which all four of the dominant peaks exist. The SWIR emitting system or material 10 having such characteristic finds utility if it is desired to identify an entity which is emitting tht specific spectra. Any combination of dyes may be employed to selectively block emission at the desired wavelengths so that a multitude of spectral emissions are produced that are readily discernable from other spectral emissions. While this example describes using various dyes to selectively block SWIR emissions, the same method is also applicable to provide selective blocking of visible, NIR, and UV wavelengths and combinations thereof.

A device associated with the SWIR emitting system or material 10 having emissions represented by 110A, 110B, and 110C could be identified by that specific spectra emission finger print, i.e. spectra fingerprint A. A device associated with the SWIR emitting system or material 10 having emissions represented by 110B, 110C, and 110D could be identified by that specific spectra emission fingerprint, i.e. spectra fingerprint B. A device associated with the SWIR emitting system or material 10 having emissions represented by 110A, 110C, and 110D could be identified by that specific spectra emission finger print, i.e. spectra fingerprint C. An entity viewing a spectra emission fingerprint associated with spectra emission fingerprints A, B, or C would easily be able to identify the device and who it may belong to based on the specific spectra emission fingerprint.

Patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A short wavelength infrared (SWIR) energy emitting system for producing SWIR energy from an emission source emitting electromagnetic energy comprising:
   a flexible or elastic substrate for securing to or covering an emission source emitting electromagnetic energy, said flexible or elastic substrate configured to be stretched to fit a desired surface comprising an emission source emitting electromagnetic energy;
   a phosphor material layer located on or applied to said flexible or elastic substrate; and
   an electromagnetic energy blocking layer located on or applied to said phosphor material layer, said electromagnetic energy blocking layer constructed and arranged to block emissions of NIR energy, NIR and visible energy, NIR and actinic energy, or NIR, visible, and actinic energy, and having one or more components that adjust surface sheen, repel dust or debris, or combinations thereof.

2. The short wavelength infrared (SWIR) energy emitting system for producing SWIR energy from an emission source emitting electromagnetic energy according to claim 1, wherein said electromagnetic energy blocking layer is constructed and arranged to block less than 100% of energy in the near-infrared, ultraviolet or visible energy bands.

3. The short wavelength infrared (SWIR) energy emitting system for producing SWIR energy from an emission source emitting electromagnetic energy according to claim 1, wherein said electromagnetic energy blocking member is a visible light filter constructed and arranged to render said emission source invisible to an eye or a visible detection system.

4. The short wavelength infrared (SWIR) energy emitting system for producing SWIR energy from an emission source emitting electromagnetic energy according to claim 1, wherein said electromagnetic energy blocking member is a NIR filter constructed and arranged to render said emission source invisible to NIR detection systems.

5. The short wavelength infrared (SWIR) energy emitting system for producing SWIR energy from an emission source emitting electromagnetic energy according to claim 1, wherein said electromagnetic energy blocking member is one or more wavelength-blocking optical filters constructed and arranged to at least partially block emissions of NIR light, visible light, or combinations thereof.

6. The short wavelength infrared (SWIR) energy emitting system for producing SWIR energy from an emission source emitting electromagnetic energy according to claim 1, wherein said electromagnetic energy blocking member is a visible light and a NIR filter constructed and arranged to render the emission source invisible to visible light and NIR detection systems.

7. The short wavelength infrared (SWIR) energy emitting system for producing SWIR energy from an emission source emitting electromagnetic energy according to claim 1, wherein said phosphor emits SWIR when excited by visible or ultraviolet light.

8. The short wavelength infrared (SWIR) energy emitting system for producing SWIR energy from an emission source emitting electromagnetic energy according to claim 1, wherein said substrate is a laminar material in the form of a sheet or roll.

9. The short wavelength infrared (SWIR) energy emitting system for producing SWIR energy from an emission source emitting electromagnetic energy according to claim 1, wherein said substrate material is stretchable to cover at least a portion of said emission source when applied thereto and does not permit visible, ultraviolet, or NIR energy to pass through when stretched.

10. The short wavelength infrared (SWIR) energy emitting system for producing SWIR energy from an emission source emitting electromagnetic energy according to claim 1, further including a securing member.

11. The short wavelength infrared (SWIR) energy emitting system for producing SWIR energy from an emission source emitting electromagnetic energy according to claim 10, wherein said securing member is an adhesive.

12. The short wavelength infrared (SWIR) energy emitting system for producing SWIR energy from an emission source emitting electromagnetic energy according to claim 1, further including UV light stabilizers or UV light absorbers.

13. The short wavelength infrared (SWIR) energy emitting system for producing SWIR energy from an emission source emitting electromagnetic energy according to claim 1, wherein said electromagnetic energy blocking member is a visible light, a NIR emissions, and an ultraviolet (UV) light filter constructed and arranged to render the emission source invisible to visible light, NIR, and UV light detection systems.

14. The short wavelength infrared (SWIR) energy emitting system for producing SWIR energy from an emission source emitting electromagnetic energy according to claim 1, wherein said system is constructed and arranged to provide an emission spectra fingerprint.

15. A short wavelength infrared (SWIR) energy emitting system for producing SWIPR energy from an emission source emitting electromagnetic energy comprising:
   a flexible or elastic substrate for securing to or covering an emission source emitting electromagnetic energy, said flexible or elastic substrate configured to be stretched to fit a desired surface comprising an emission source emitting electromagnetic energy;
   a phosphor material layer located on or applied to said flexible or elastic substrate;
   an electromagnetic energy blocking layer located on or applied to said phosphor material layer, said electromagnetic energy blocking layer constructed and arranged to block emissions of NIR energy, or NIR and visible energy; and
   a surface functional layer located on or applied to said electromagnetic layer, said surface functional layer constructed and arranged to block actinic light, adjust surface sheen, reduce tackiness, provide scratch resistance, or combinations thereof.

16. The short wavelength infrared (SWIR) energy emitting system for producing SWIR energy from an emission source emitting electromagnetic energy according to claim 15, wherein said electromagnetic energy blocking layer is constructed and arranged to block less than 100% of energy in the near-infrared, ultraviolet or visible energy bands.

17. The short wavelength infrared (SWIR) energy emitting system for producing SWIR energy from an emission source emitting electromagnetic energy according to claim 15, wherein said electromagnetic energy blocking member is a visible light, a NIR emissions, and an ultraviolet (UV) light filter constructed and arranged to render the emission source invisible to visible light, NIR, and UV light detection systems.

18. The short wavelength infrared (SWIR) energy emitting system for producing SWIR energy from an emission source emitting electromagnetic energy according to claim 15, further including UV light stabilizers or UV light absorbers.

19. The short wavelength infrared (SWIR) energy emitting system for producing SWIR energy from an emission source emitting electromagnetic energy according to claim 15, wherein said system is constructed and arranged to provide an emission spectra fingerprint.

20. The short wavelength infrared (SWIR) energy emitting system for producing SWIR energy from an emission source emitting electromagnetic energy according to claim 15, wherein said system includes an adhesive material layer located or layered on a side of said flexible or elastic substrate which is opposite of said phosphor material layer.

21. The short wavelength infrared (SWIR) energy emitting system for producing SWIR energy from an emission source emitting electromagnetic energy according to claim 15, wherein said phosphor emits SWIR when excited by visible or ultraviolet light.

22. A material for converting visible or ultraviolet light to short wavelength infrared (SWIR) energy comprising:
   a flexible or elastic substrate for delivering said material to a source of visible or ultraviolet light, said flexible or elastic substrate configured to be stretched to cover a surface having an emission source emitting electromagnetic energy or an object emitting electromagnetic energy;
   a phosphor layer which emits SWIR energy when exposed to visible or ultraviolet light emitted from said source of visible or ultraviolet light, said phosphor material layer located on or applied to said flexible or elastic substrate;
   a filter layer located on or applied to said phosphor layer and constructed and arranged for preventing NIR from being emitted;
   a surface functional layer located on or applied to said filter layer, said surface functional layer having one or more components that adjust surface sheen, repel dust or debris, or combinations thereof.

23. The material for converting visible or ultraviolet light to short wavelength infrared (SWIR) energy according to claim 22, wherein said material includes an adhesive material layer located or layered on a side of said flexible or elastic substrate which is opposite of said phosphor material layer.

24. The material for converting visible or ultraviolet light to short wavelength infrared (SWIR) energy according to claim 22, where said filter layer or said surface functional layer is further constructed and arranged to block visible light or ultraviolet light.

25. The material for converting visible or ultraviolet light to short wavelength infrared (SWIR) energy according to claim 22, wherein said material includes an adhesive material layer located or layered on a side of said flexible or elastic substrate which is opposite of said phosphor material layer.

* * * * *